Figure 1:
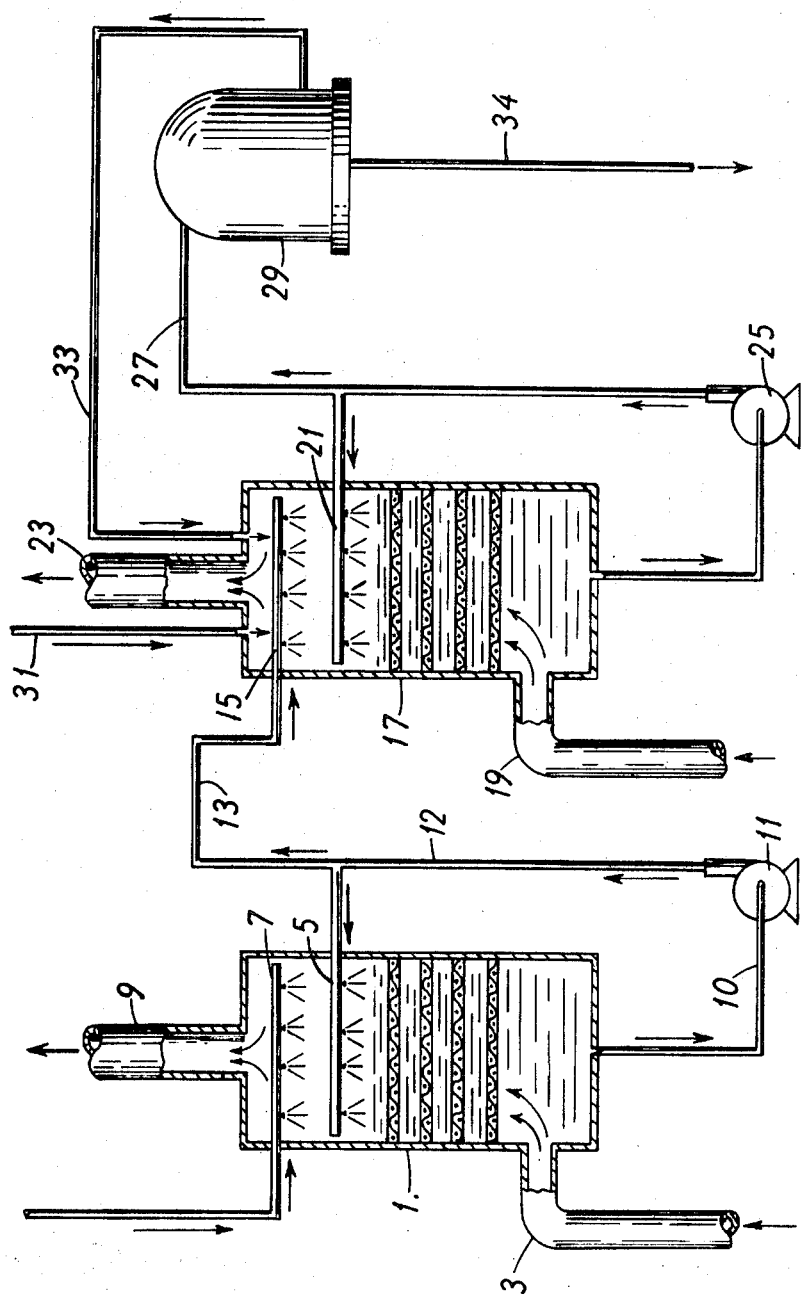

United States Patent
> Howard et al.

[15] 3,634,999
[45] Jan. 18, 1972

[54] METHOD FOR RECOVERING DUST PRODUCED IN SODIUM CARBONATE MANUFACTURE

[72] Inventors: Carlton J. Howard, Salina; Eugene B. Port, Solvay, both of N.Y.

[73] Assignee: Allied Chemical Corporation, New York, N.Y.

[22] Filed: Apr. 8, 1970

[21] Appl. No.: 26,544

[52] U.S. Cl. ..........................................55/72, 55/94, 23/302
[51] Int. Cl. ...............................B01d 47/06, C01d 1/30
[58] Field of Search ................55/72, 85, 94; 23/298, 299, 23/302, 63, 64

[56] References Cited

UNITED STATES PATENTS

| 3,498,744 | 3/1970 | Frint et al. | 23/63 |
| 2,981,370 | 4/1961 | Pilo | 55/85 |
| 2,887,360 | 5/1959 | Hoekie | 23/302 |
| 2,704,239 | 3/1955 | Pike | 23/302 |
| 3,315,443 | 4/1967 | Manino | 55/85 |

Primary Examiner—Charles N. Hart
Attorney—Gerard P. Rooney

[57] ABSTRACT

Dust and fines issuing from trona processing systems in the manufacture of sodium carbonate are removed by scrubbing the dust ladened gases with an aqueous scrubbing solution under conditions sufficient to remove the fines from the gases and preferably effect particle growth of said dust and fines in the scrubbing solution and separating the solids of larger particle size and returning them to the trona processing system.

12 Claims, 2 Drawing Figures

INVENTORS
CARLTON J. HOWARD
EUGENE B. PORT

METHOD FOR RECOVERING DUST PRODUCED IN SODIUM CARBONATE MANUFACTURE

This invention relates to a process for removing $Na_2O$ values from dust entrained with air and/or other gases vented during the production of soda ash from naturally occurring trona.

Trona, as found in Wyoming and in other parts of the world, consists essentially of sodium sesquicarbonate ($Na_2CO_3 \cdot NaHCO_3 \cdot 2H_2O$) and about 3–15 percent or more insoluble impurities. Trona has been processed to prepare either essentially pure sodium bicarbonate, sodium sesquicarbonate, or sodium carbonate by a number of procedures as exemplified in U.S. Pat. Nos. 2,343,080; 2,343,081; 2,639,217; 2,704,239; 2,770,524; 2,962,348; 3,028,215; 2,131,996; and 3,260,567. Generally, in the processes described in the above patents, the trona is crushed or ground into small particles either prior to or subsequent to a calcination step for converting the crude or processed trona into anhydrous sodium carbonate. In the grinding and handling of this material and in its subsequent calcination, substantial amounts of dust and fines are formed and become entrained in the air and gases vented from the system.

While various types of dry dust separators have previously been proposed and employed in trona processing plants to recover the larger dust particles, substantial quantities of the dust in a fine state (less than about 200 mesh) escape from such separators into the atmosphere.

This discharge of dust into the atmosphere constitutes not only a considerable loss of $Na_2O$ values, but also contributes to air pollution. Accordingly, an efficient removal of this dust minimizes the problem of air pollution and more importantly a recovery of this dust represents a process improvement of real economic value.

In the past, it has been the practice to use dry dust separators but on the whole they have been unsuccessful in preventing substantial amounts of valuable $Na_2O$ values being exhausted to the atmosphere. Also, while gas scrubbers which rely on a liquid to remove particles from a gas stream are available, their use in a trona processing system introduce new problems which may upset the balance of the system. Generally, in a trona processing system the mined trona is first crushed, then calcined to produce a crude sodium carbonate which is dissolved in an aqueous solution to produce a substantially saturated sodium carbonate solution. The saturated solution is processed to remove insolubles and organics (if any) to produce a substantially pure sodium carbonate solution which may then be subjected to crystallization procedures as described in the above patents. There are in the above system substantial amounts of vent gases containing dust from the trona ore (sodium sesquicarbonate) handling system and the calcined trona (crude anhydrous sodium carbonate) operation.

If a conventional wet-scrubber were used, the uncalcined trona, comprising essentially sodium sesquicarbonate, would produce a solution having a low pH because of the $NaHCO_3$ factor, and consequently, would be highly corrosive to the conventional steel equipment generally employed in trona processing. A similar problem is encountered when the calcined trona dust is removed by aqueous scrubbing, for the carbon dioxide, a byproduct of the calcining step, reacts with the sodium carbonate dust to produce sodium bicarbonate, which as before, produces a solution corrosive to the standard processing equipment. While it is possible to eliminate this problem by treating the aqueous solution with lime or reacting it with caustic, such approaches introduce an extra step and additional raw materials, which add to the manufacturing costs.

It has now been found that the dust particles and fines which pass through a preliminary dry dust separator may be removed and preferably recovered by passing the air containing entrained raw trona and/or calcined trona, into an aqueous scrubbing solution maintained under conditions favorable to dissolution, crystallization and crystal growth of the dust particles and fines to a size suitable for recovery and further processing. Particularly, it has now been found that the trona dust and fines and calcined dust and fines normally exhausted to the atmosphere are removed, recovered and converted to sodium carbonate.

It has been found that when these relatively large particles which are recovered are charged into the calciner, they tend to remain large, and therefore remain with the bulk of the calcined material to be processed to soda ash, rather than being vented from the calciner as dust.

Wet scrubbers have been employed in the past to recover $Na_2O$ values from the trona and calcined trona dust, entrained in the stack gases and plant exits, (or from the exits of inefficient dry dust separators).

When the scrubbing solutions have been returned to the process stream without neutralization the acidic sodium bicarbonate and sodium sesquicarbonate in the liquors have posed a serious corrosion problem when subsequently processed in the evaporator crystallizers. The sodium bicarbonate in these liquors results from the reaction between the carbon dioxide in the calciner stack gases, and the sodium carbonate solution formed in the scrubbers.

In the method of our invention, none of these acidic solutions reach the processing equipment as they are either purged, or returned as solids to the calciner where they decompose to the noncorrosive carbonate before reaching the evaporator crystallizers.

These and other objects are accomplished by scrubbing the gas entraining raw trona and/or calcined trona dust with an aqueous scrubbing solution under conditions to dissolve the carbonate values in the gases. The scrubbing solution is an aqueous solution preferably containing carbonate values, the concentration of which can vary in the solution so that it is either unsaturated, saturated, or a slurry containing not more than 25 percent solids by weight, with regard to carbonate values. The scrubbing solution may contain these carbonate values in the form of at least one of sodium sesquicarbonate, sodium carbonate and sodium bicarbonate. Also, the scrubbing solution may contain insolubles and traces of organics common to natural trona. The temperature of this scrubbing solution may be ambient or above. The scrubbing operation is normally carried out at atmospheric pressure, but pressure is not a controlling factor, so that pressures below atmospheric may be used if desirable.

Any of the many varieties of scrubbing units known to the art may be employed, either singly, or with two or more operating in parallel or series. Air or gas entraining carbonate fines from both the crushing, grinding and handling operation, and from the calcining operation can be combined, or scrubbed separately in two or more scrubbers with the air or gas passing countercurrent to the flow of the aqueous scrubbing solution. The scrubbing solution may be essentially the same for two or more scrubbers, or differ in composition and temperature. The carbonate product solution which may be in the form of a slurry removed from one scrubber, for example, may be used advantageously as part or all of the scrubbing solution for another. In any case, the air or gas from the calcining operation enters the scrubber or scrubbers at a temperature above ambient temperature, but below about 500° F.

Buildup of the solids in the scrubbing solution in the scrubbers may be accomplished by recirculating the scrubbing solution countercurrent to the gas being scrubbed. A carbonate product solution is obtained which may be in the form of either a solution, preferably saturated, or a slurry which is withdrawn to a solids separator for separation of the sodium sesquicarbonate, sodium bicarbonate and/or sodium carbonate monohydrate values from it. At this point, the carbonate product solution for efficiency of the process is saturated, and the solids in the slurry are present in amounts between 5 and 25 percent by weight of the total slurry. Some cooling of the carbonate product solution is desirable to optimize crystal growth. The separated liquor from the solids separator may be recycled to the scrubbing system as part of the scrubbing solution or partially or completely purged from the system. The separated solids, which now consist of particles, at least 80 percent of which are above 200 mesh, are returned to the trona processing system. Alternatively, the entire carbonate product solution may be discharged to waste should it contain a high degree of insoluble impurities recovered from the vent gases, rather than reintroducing them into the processing system.

Figure 2:
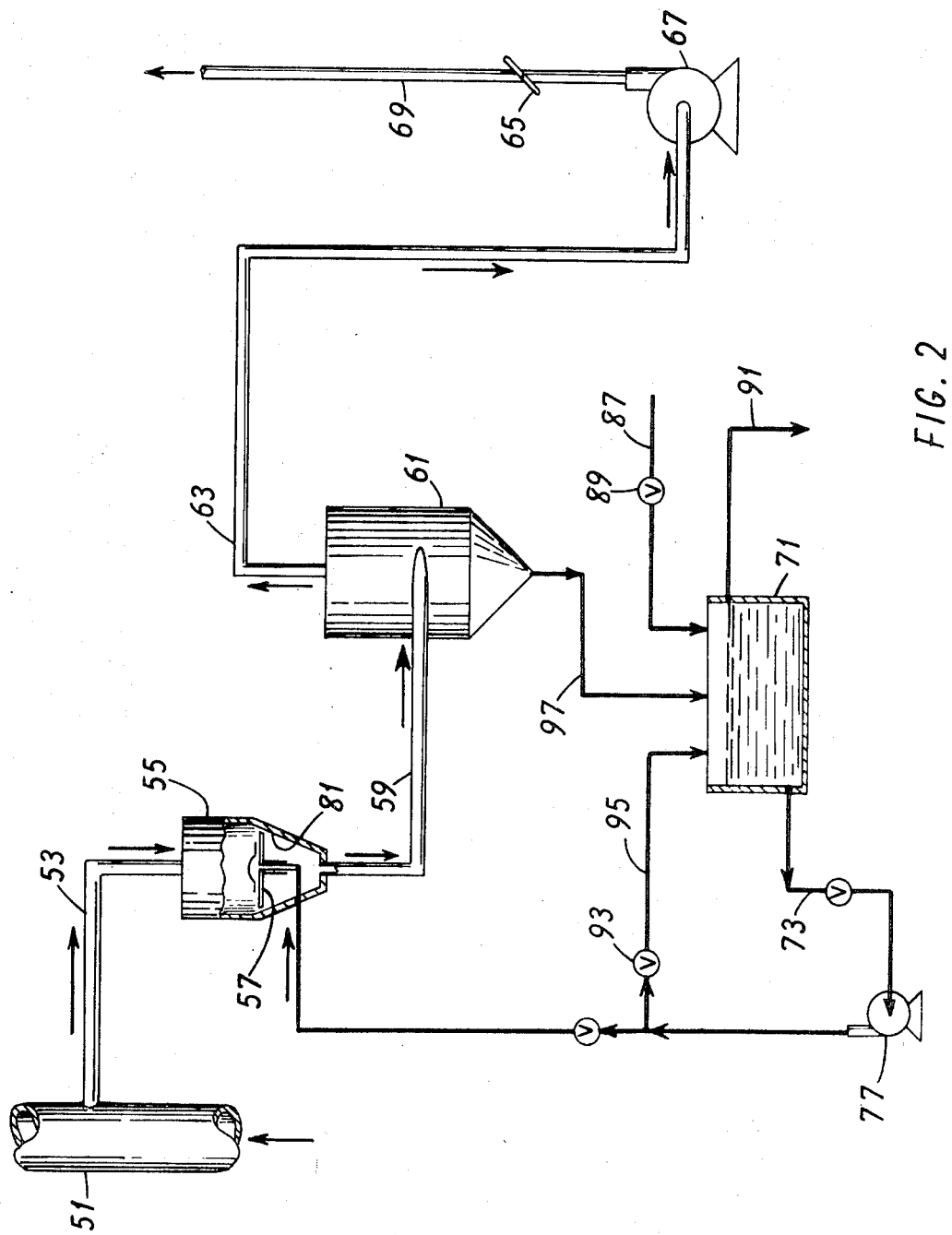

FIG. 1 represents one embodiment of the present invention; and FIG. 2 depicts one of several types of scrubbers that could be employed therein.

Referring to the drawing, FIG. 1, a stream of air with entrained raw trona dust, more than 90 percent of which has a particle size of less than about 200 mesh, is conducted through conduit 3 into a grid packed raw trona dust scrubber 1, operated under atmospheric pressure. This dust ladened air stream travels upward through the packing, countercurrent to the downward flow of an aqueous scrubbing solution at ambient temperature, introduced at sparger 5. This solution contains about 10 percent soluble trona as well as an insoluble portion, present to the extent of about 0.05 percent, as a finely divided suspension. As the gas passes upwardly through the packing, the entrained trona particles are scrubbed by the downward flow of the solution. The scrubbed essentially dust-free air is further contacted with makeup solution entering the scrubber through sparger 7, after which it escapes to the atmosphere through an entrainment separator, not shown, and scrubber vent 9. The positioning of sparger 7 above sparger 5 has been found advantageous in that the vent gases receive a final scrub with fresh scrubbing solution which is preferably an aqueous solution not substantially saturated with trona values, with water being especially preferred, to remove any entrained droplets of the solution in the gases.

The carbonate product solution containing trona is withdrawn from the bottom of scrubber 1, via line 10 and passed through line 12 by means of slurry pump 11. The quantity of product solution withdrawn by the pump amounts to about two to five times by volume the quantity of scrubbing solution introduced through sparger 7. A portion of this stream, approximately equal to the quantity of scrubbing solution introduced through sparger 7, is directed by valving means not shown, through line 13, to sparger 15 in a second similar scrubber 17. This flow is adjusted so as to maintain the quantity of liquid in scrubber 1 at a constant. The balance of the product solution is recirculated back to scrubber 1 by valving means through sparger 5. It is clear, therefore, that the scrubbing solution used in scrubber 1 is formed in situ, from the incoming makeup aqueous solution, and the trona dust entrained in the countercurrent stream of air from the trona handling area, and that its composition is essentially maintained by the fact that the portion of carbonate product solution passed to the second scrubber 17, through line 13, is replaced by the freshly formed solution obtained from the gas entrained trona fines and the makeup aqueous solution entering the system via sparger 7.

Scrubber 17, shown as similar in design to scrubber 1, and which receives carbonate product solution from that scrubber, through sparger 15, also receives a stream of hot gas from the trona calciner. These gases, received at about 473° F., contain suspended calcined trona solids having a particle size substantially less than about 200 mesh. This gas, with its entrained particles, are received through line 19, and flow upward, countercurrent to the downcoming carbonate scrubbing solution. The scrubbed gas, having given up most of its heat, passes through an entrainment separator, not shown, and is vented to the atmosphere through vent 23.

In addition to the gas vented as 23, there is also considerable water vapor, and some entrained trona, sodium carbonate and sodium bicarbonate so that the solution within scrubber 17 undergoes a considerable degree of cooling and concentration. This situation, brought about by the high temperature of the incoming gas from the calciner, establishes a condition conducive to crystallization and crystal growth. Under these circumstances, the incoming carbonate dust particles become seed crystals, and grow through crystallization. The scrubbing solution preferably is permitted to become a saturated slurry containing between 5 and 25 percent solids, comprising primarily sodium carbonate monohydrate and sodium sesquicarbonate crystals. A slurry pump 25 removes between two to five times as much material by volume from the bottom of scrubber 17, as is received from scrubber 1 through sparger 15. A portion of this stream, approximately equal to 65 percent by volume of the scrubbing solution received from scrubber 1 through line 13, is diverted by valving not shown, to solids separator 29. This flow is further adjusted so that the quantity of slurry retained by the scrubber remains essentially constant. The remaining portion of the slurry stream is recycled by valving means, back to scrubber 17, via sparger 21. Some or all of the filtrate from the solids separator may be sparged into the top of scrubber 17, or purged, depending on its quality, to control the level of soluble chloride, sulfate, organic or other impurities The percent of solids in this slurry preferably is kept at about 20 percent by weight and no more than 25 percent by weight since above this point the slurry may gel. As noted above, the percent solids is maintained by regulating the flow of the various streams into the scrubber 17, primarily by regulating the flow of solution to solids separator 29 via line 27.

To control gel formation when the solids content of the scrubbing solution becomes too high, an aqueous solution is added to scrubber 17 via line 31. The solids separated by separator 29 are returned to the calciner, to convert the sodium sesquicarbonate, bicarbonate and monohydrated carbonate crystals to anhydrous sodium carbonate. Better than 90 percent of these crystals are above 200 mesh, and they have been found to essentially retain their particle size in passing through the calciner.

In order to better understand the workings of the present invention, the following examples are offered:

EXAMPLE 1

Reference is made to the accompanying flow diagram of FIG. 1, wherein about 2,250 parts of suspended raw trona dust, comprising about 2,000 parts trona having a particle size essentially less than 200 mesh, 250 parts insolubles and minor amounts of sodium sulfate, sodium chloride and organics in about 200,000 parts of air, enter the raw trona dust scrubber 1 at a point near the discharge end via line 3. To the scrubber, 22,500 parts of water are introduced through sparger 7 near the top of the scrubber, the water falling through the grid packing countercurrent to the upward flow of dust ladened air. The trona (sodium sesquicarbonate) continuously dissolves in the water to form about a 10 percent solution by weight. The insolubles remain suspended as a slurry, being present to the extent of about 0.05 percent.

A slurry pump 11 removes the solution with its suspended solids from the bottom of the raw trona dust scrubber at a rate about five times as great as that of the incoming water at sparger 7.

A portion of this flow in an amount about equal to that of the flow of water entering through sparger 7 is directed by valving means not shown through line 13, to serve as part of the scrubbing liquid for the scrubbing of the calcined trona dust in scrubber 17. The remaining portion of the flow, being about four-fifths of the total, is directed to sparger 5 by valving means, and thus recycled to a point near the top of the scrubber, but below the water sparger 7. This recycled solution is distributed to the grid packing by means of sparger 5. The amount of solution diverted to scrubber 17 is adjusted so as to maintain the quantity of solution in scrubber 1, essentially constant. Adjustments in the amount of recycle can be made to provide the optimum amount of scrubbing slurry in scrubber 1. As indicated above, this may be about four times the volume of the incoming water at sparger 7.

The scrubbed air exhausts through an entrainment separator to the atmosphere at vent 9 containing about 2,200 parts of entrained water and water vapor. The loss of entrained solids is kept at a minimum by having the water sparger above the sparger for introducing the recycled slurry, so that the gas is scrubbed with fresh solution prior to passing through an entrainment separator and finally being exhausted to the atmosphere.

The carbonate product solution moving forward from the raw trona dust scrubber 1, through line 13, to the calcined dust scrubber 17, contains approximately 20,300 parts of water, 2,000 parts of sodium sesquicarbonate and 250 parts of suspended insolubles.

About 232,000 parts of gas from a trona calciner, after passing through a preliminary dry dust separator, contains a residual 1,310 parts of calcined trona dust comprising approximately 1,110 parts of sodium carbonate, and 200 parts of insolubles with minor amounts of other impurities such as sodium sulfate, sodium chloride and organics. These gases at a temperature of about 473° F. are introduced into the lower portion of the calcined trona dust scrubber 17 through line 19. The solids in the calciner gases are scrubbed by the countercurrent flow of solution from the raw trona dust scrubber 1, fresh makeup solution, recirculated solution by means of slurry pump 25 and recycled mother liquor via line 33. The percent solids in the slurry at 17 is controlled by the amount withdrawn through line 27 and by the quantity of water being introduced to scrubber 1 and 17.

The total recycle in the calcined trona dust scrubber 17 is maintained at about four times the volume of carbonate product solution entering from the raw trona scrubber 1. With the quantity of suspended solids in the carbonate product solution in the form of a slurry maintained at about 20 percent, the composition of the slurry entering separator 29 is approximately as follows:
Solution:
  29.6 percent by weight sodium carbonate
  2.3 percent by weight sodium bicarbonate
  68.1 percent by weight water
Solids:
  14 percent by weight insolubles
  42 percent by weight sodium carbonate monohydrate
  44 percent by weight sodium sesquicarbonate
Temperature of the slurry: about 172° F. at 11.6 PSIA.

Although the dust treated in the dust scrubbers is essentially under 200 mesh, 90 percent of the sodium carbonate monohydrate, sodium bicarbonate and sodium sesquicarbonate crystals removed in the solids separator 29 are greater than 200 mesh. The wet solids from centrifuge 29, the particles of which are larger than the dust particles originally removed by scrubbing, leave the centrifuge at outlet 34 and are returned to the calciner, not shown, along with the raw crushed trona feed. These particles essentially retain their size on passing through the calciner in their conversion to anhydrous sodium carbonate and do not appreciably contribute to the dust issuing from this calcining operation. The wet solids comprise about 420 parts of insolubles, 1,250 parts of sodium carbonate monohydrate crystals, 1,310 parts of sodium sesquicarbonate crystals, a small variable quantity of sodium bicarbonate and 150 parts of mother liquor. This corresponds to about a 79 percent recovery of $Na_2O$ values from the dust in the two gaseous dust ladened streams normally being vented to the atmosphere after conventional dry dust separation.

EXAMPLE 2-4

Referring to FIG. 2, of the drawings, the stack from a raw trona calciner is shown as number 51. At this point the hot gases from the calciner have left the dry dust separators which have removed the bulk of the entrained calcined trona dust. These gases, at the point shown, are about to be vented to the atmosphere. This gas stream still entrains objectionably high quantities of dust particles, about 90 percent of which are less than 325 mesh (45 microns), and 63 percent of which are less than 5 microns. As previously mentioned, this represents an economic loss of $Na_2O$ values as well as a serious dust emission problem.

A scrubber of the flooded disc type is employed and a portion of the stack gas is passed through conduit 53 to scrubber 55. The scrubbing solution consists of a recycled aqueous solution formed in situ from makeup water supplied through line 87 to reservoir 71, and the entrained solids. It therefore contains sodium carbonate, sodium bicarbonate, insolubles, and organic impurities. The analysis of the scrubbing solutions used are given in table 1 below.

This scrubbing solution is drawn out of reservoir 71 via line 73 through pump 77 and passed to scrubber 55 via line 77. The gases pass through the system with the aid of blower 67 and the rate of flow is controlled by butterfly valve 65. A pressured differential develops between the gas entering the scrubber from conduit 53, and that leaving at conduit 59, as a result of a pressure drop at the annulus in the scrubber between the disc 57 and the surrounding conical wall, 81.

The intimate mixture of gas and scrubbing solution leaving the bottom of the scrubber, passes through conduit 59 to mist separator 61, at which point the scrubbed gases leave through conduit 63, enter the intake of blower 67, and are exhausted to the atmosphere through stack 69.

The enriched scrubbing solution leaves the bottom of mist separator 61 at 97 and drains back to reservoir 71 for recirculation.

Since the gases are hot, considerable water vapor is lost to the atmosphere through stack 69; therefore, makeup water must be added through valve 89.

When the scrubbing solution has been sufficiently enriched with $Na_2O$ values, it is drained periodically or bled continuously through line 91, for further processing as in example 1, or purged to waste.

The amount of solution entering the scrubber can be varied by means of valve 93, which permits All, or any fraction of the recycling scrubbing solution to bypass the scrubber through line 95.

The date in table I are obtained from the operation of the above system.

TABLE I

| Examples | II | III | IV |
| --- | --- | --- | --- |
| Test Number | 11 | 13 | 32 |
| Gas diverted to flooded disc scrubber from trona stack ft.³/min. adjusted to standard conditions | 532 | 548 | 392 |
| Gas temp. at scrubber inlet¹ | 285° F. | 285° F. | 275° F. |
| Gas temp. when exhausted to atmosphere | 175° F. | 167° F. | 178° F. |
| Temp. of scrubbing liquor | 147° F. | 147° F. | 147° F. |
| Scrubbing liquor recycle, gals./min. | 4 | 6 | 6 |
| Scrubbing liquor, H₂O makeup, gals./min. | 0.5 | 0.25 | 0.10 |
| Analysis, scrubbing liquor, Na₂CO₃ | 11.0% | 11.0% | 19.6% |
| Analysis, scrubbing liquor, NaHCO₃ | 1.56% | 1.56% | 2.92% |
| Analysis, scrubbing liquor, Insolubles | 1.53% | 1.53% | 2.6% |
| Analysis, scrubbing liquor, Organic as Carbon | 0.058% | 0.058% | 0.081% |
| Press. Differential across disc, water gauge | 16.5" | 24.0" | 25.0" |
| Grain load, inlet gas, Grains/ft.³ std.² | 2.74 | 2.74 | 2.74 |
| Grain load, to atmosphere std. | 0.29 | 0.24 | 0.11 |
| Percent of fines removed | 89.5% | 91.2% | 96.0% |

¹The main stream of gas from the calciner is about 473° F., but the gas is partially cooled because of heat loss in the pipe between the stack and the scrubber.

²"Grain load" is grains (avoirdupois) per ft.³ of gas—gas volume corrected to standard conditions. Grain load was determined four times during series of runs (was consistent). This figure is average of the four.

Under the conditions existing at the site of the tests, the maximum pressure differential that could be attained across the flooded disc, was limited to about 25-inch water gauge (WG). It is clear, however, that the efficiency of the scrubber is related in part to this differential pressure, the greater the differential pressure the greater the scrubber's effectiveness in removing fines. It is also clear that this particular type of scrubber is capable of removing better than 95 percent of the entrained fines, 63 percent of which are below 5 microns in diameter, (particle size determination performed in accordance with the provisions of ASME Power Test Code 28).

Although certain preferred embodiments of the invention have been here disclosed for purposes of illustration, it will be evident that various changes and modifications may be made therein, without departing from the scope and spirit of the invention.

What we claim is:

1. A process for recovering $Na_2O$ values from a gas previously passed through a dry dust separator in a trona processing system containing at least one compound having $Na_2O$ values entrained therein selected from the group consisting of trona and calcined trona, which comprises contacting said gas containing said entrained particles of said compound which have a predominant particle size range of less than about 200 mesh with an aqueous scrubbing solution under crystallization conditions sufficient to effect formation of a stable crystal phase of at least one $Na_2O$-containing compound selected from the group consisting of sodium sesquicarbonate, sodium bicarbonate and sodium carbonate monohydrate having a predominant particle size range in excess of 200 mesh, venting said gas substantially reduced in its $Na_2O$ content to the atmosphere; separating the crystals from the solution and returning the crystals of increased particle size to the trona processing system.

2. The process of claim 1 wherein the carbonate product solution comprises an aqueous slurry containing less than about 25 percent by weight of suspended $Na_2O$-containing solids.

3. The process of claim 1 wherein the scrubbing solution contains dissolved sodium sesquicarbonate.

4. The process of claim 1 wherein the scrubbing solution contains dissolved sodium carbonate 5. The process of claim 1 wherein the $Na_2O$ values of the gas comprise trona, the aqueous scrubbing solution contains dissolved sodium sesquicarbonate and the slurry solids of the carbonate product solution comprise sodium sesquicarbonate.

6. The process of claim 1 wherein the $Na_2O$ values of the gas comprise calcined trona, the aqueous scrubbing solution contains dissolved sodium carbonate and the slurry solids of the carbonate product solution comprise sodium carbonate monohydrate.

7. The process of claim 1 wherein the $Na_2O$-containing solids are separated from the aqueous phase of the slurry and converted to anhydrous sodium carbonate.

8. A process for recovering $Na_2O$ values entrained in gases emanating from dry dust separators associated with the processing of trona, as dust particles of trona and calcined trona, each having a predominant particle size range of less than about 200 mesh, which comprises treating the gases by contacting the gas containing entrained trona particles in a zone with an aqueous scrubbing solution having dissolved therein carbonate values under conditions sufficient to effect formation of a carbonate product solution containing sodium sesquicarbonate and having a sodium sesquicarbonate solids content of less than 25 percent by weight; removing said carbonate product solution of sodium sesquicarbonate from said first zone and passing it to a second zone into which is introduced a gas containing the entrained calcined trona particles together with an aqueous scrubbing solution having dissolved therein carbonate values, contacting said calcined trona gas with said scrubbing solution under conditions sufficient to effect formation of a carbonate product solution and a stable crystal phase of at least one of sodium sesquicarbonate, sodium bicarbonate and sodium carbonate monohydrate having a predominant particle size range in excess of 200 mesh and a solids content of no more than about 25 percent solids by weight, separating said crystals from the mother liquor and returning the separated crystals of increased particle size to the trona processing system and venting said gases substantially reduced in its $Na_2O$ content to the atmosphere.

9. The process of claim 8 wherein the aqueous scrubbing solution used to treat the gas containing entrained trona particles is formed in situ by dissolving the entrained trona in an aqueous solution.

10. The process of claim 8 wherein a portion of the carbonate product solution removed from the contacting zone used to treat the gas containing entrained trona is recycled to the contacting zone and forms a part of the aqueous scrubbing solution.

11. The process of claim 8 wherein the carbonate product solution from the contacting zone for treating the gas containing entrained trona is diluted in the contacting zone for treating the gas containing entrained calcined trona with at least one aqueous solution selected from the group consisting of water, recycled mother liquor from the separation of at least one of sodium sesquicarbonate, sodium bicarbonate and sodium carbonate monohydrate crystals, and a portion of the carbonate product solution removed from the contacting zone for treating the gas containing entrained calcined trona.

12. The process of claim 8 wherein the separated crystals of at least one of sodium sesquicarbonate, sodium bicarbonate and sodium carbonate monohydrate are converted to anhydrous sodium carbonate.

* * * * *